Dec. 2, 1941.        G. C. WERNING        2,264,493
FENCE POST
Filed Aug. 8, 1938        2 Sheets-Sheet 1

INVENTOR.
GEORGE C. WERNING
BY Flournoy Corey
ATTORNEY

Dec. 2, 1941.  G. C. WERNING  2,264,493
FENCE POST
Filed Aug. 8, 1938  2 Sheets-Sheet 2

INVENTOR.
GEORGE C. WERNING
BY Flournoy Corey
ATTORNEY

Patented Dec. 2, 1941

2,264,493

UNITED STATES PATENT OFFICE 2,264,493

FENCE POST

George C. Werning, Newhall, Iowa

Application August 8, 1938, Serial No. 223,713

2 Claims. (Cl. 189—27)

This invention relates to posts and fencing and has particular relation to a post structure particularly suitable for use with so-called electric fencing or charged fencing in which the post is of light construction but carries an electrically charged wire, the shocking effect of which is used to confine cattle, horses and other animals.

In posts of this character, the post itself need not be of particularly great strength, but it should be anchored at spaced points so as to resist wind load and other horizontal loading. Furthermore, if only one wire is used, it is desirable that means be provided for adjusting the vertical spacing with reference to the ground, so that the fence may be used for confining different sizes of animals.

Among the objects of my invention is to provide a light post which provides bracing at spaced intervals to meet horizontally acting loading, and to provide a means for supporting a charged wire at any desired spacing with respect to the ground.

The use of "electric fence" has made it possible to utilize lightly constructed fence posts which may be moved from place to place, but this necessitates withdrawing the post from the ground and replacing at a different location. This may be a considerable task.

It is among the objects of my invention to provide a folding post which may be laid down on the ground so that a mower or other harvesting machine may be run quite close to the fence or even run over the fence in its folded down position so as to make the greatest use of available area for cultivation.

Another advantage of my folding post is that the weeds and grass may be cut so as to prevent grounding of the charged wire.

Another object of my invention is to provide a light, strong fence post which may be constructed at a low cost.

Still another object of my invention is to provide an easily adjustable insulating support for the charged wire.

A further object of my invention is to provide means for insulating the post to the ground.

Another object of my invention is to provide a post which may be easily pushed into the ground with the foot and which may be readily removed from the ground.

Other and further features and objects of the invention will be more apparent to those skilled in the art upon a consideration of the accompanying drawings and following specifications, wherein are disclosed several embodiments of the invention, with the understanding, however, that such changes may be made therein as fall within the scope of the appended claims, without departing from the spirit of the invention.

Figure 1:
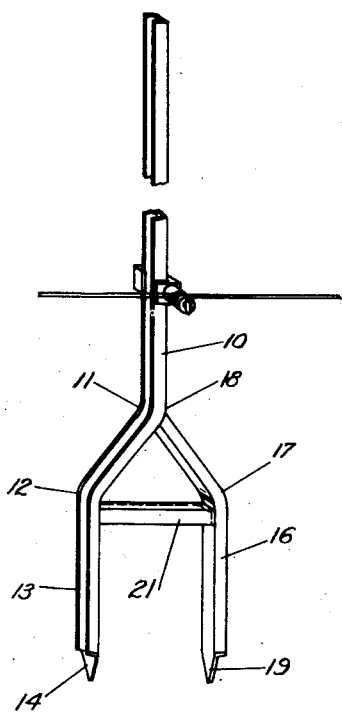
Figure 1 is a view in perspective of a fence post constructed according to one embodiment of my invention.

Referring now to the drawings, and particularly to Figure 1 thereof, illustrating a preferred form of a post constructed according to one embodiment of my invention. In the structure shown in Figure 1 the post is constructed of one long member 10 which is bent at an angle of about 30 degrees, as indicated at 11, and then bent inwardly again as indicated at 12, to afford one leg of a double pronged post. The lower end of the leg 13 is pointed, as indicated at 14, to facilitate easy penetration of the ground. Another short leg 16 is provided and this leg is also bent inwardly, as indicated at 17, and is affixed by welding or other means near the bend 11 of the arm 10, as indicated at 18. This leg also is pointed at the lower end, as indicated at 19. I preferably provide a step member 21 which is welded to the legs 13 and 16 just below the bends 12 and 17. This step may be used for pushing the prongs of the post into the ground and also provides a strong, stiff bracing for the legs of the post.

Figure 2:
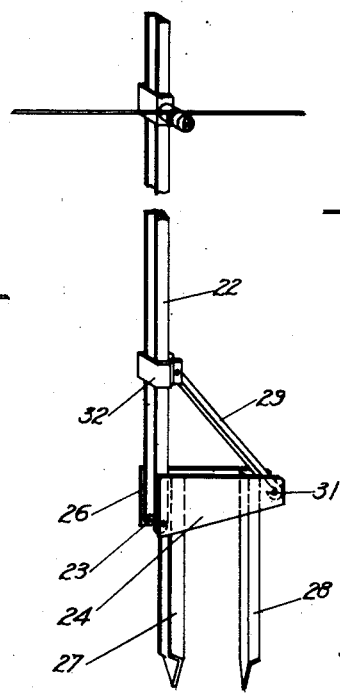
Figure 2 is a view in perspective of a fence post constructed according to a modification of my invention.

In Figure 2 I have illustrated a post having substantially the same general structure as the post shown in Figure 1 but consisting of one upright post member 22 which is pivotally engaged at its lower end by means of a pin 23 to spaced plates 24 and 26. Two spaced legs 27 and 28 are provided and these are welded or otherwise secured to the inner faces of the opposed plates 24 and 26.

The plates 24 and 26 are made relatively wide at the end to which the post 22 is pivoted. They are spaced so as to engage the post quite snugly and thereby provide vertical bracing for the post.

A brace 29 is provided and is pivotally engaged to the ends of the plates 24 and 26 opposite the pivot 23 as by means of a pin 31. The upper end of the brace 29 is engaged to the post 22 by means of a pin through a clamp 32. The pin 31 is preferably in the form of a cotter key, the removal of which will permit the post to be folded flat against the ground.

Figure 3:
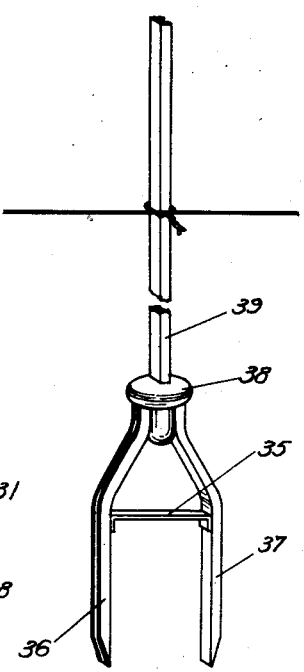
Figure 3 is a view in perspective of another modification of the device shown in Figures 1 and 2.
Figure 6:
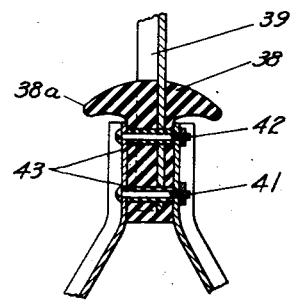
Figure 6 is enlarged detail of the insulator structure of the post illustrated in Figure 3.

In the device illustrated in Figure 3, substantially the same structure as illustrated in Figure 1 is employed except that the legs 36 and 37 are of about the same length and are separate from the post portion 39. These members are secured to an insulating member 38 in which the post structure 39 is received. The means for securing these parts together is illustrated in Figure 6 and includes bolts 41 and 42.

The insulator is preferably of the petticoat type, that is one having an outwardly extending flange, as at 38a, so as to prevent electrical leakage during rainy weather.

I preferably provide sleeves 43 surrounding the bolts 41 and 42 and slightly longer than the openings through the insulator 38, so that when these bolts are drawn down, the edges are ends of the sleeves would be compressed to form tight seals between the bolts and the insulators.

Figure 5:
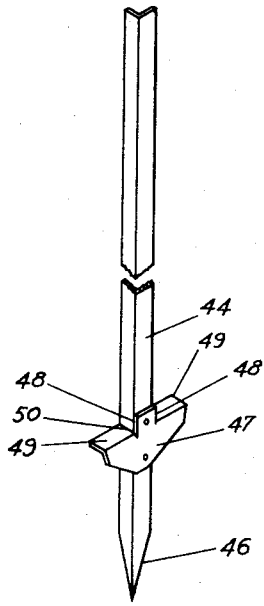
Figure 5 is a view in perspective of a modified form of the fence post shown in Figure 1.

In Figure 5 I have illustrated another modification of my invention in which an angle bar 44 sharpened at the lower end, as indicated at 46, is employed for the post. A step member 47 is employed and consists of a roughly triangular sheet member, cut as shown at 48—48 and with the outer portions of the upper edge folded down as indicated at 49, to provide steps on the opposite sides of the post. The edge of the plate may be welded to the angle bar where it adjoins as at 50. This affords a very stiff structure even though light materials are employed.

Figure 4:
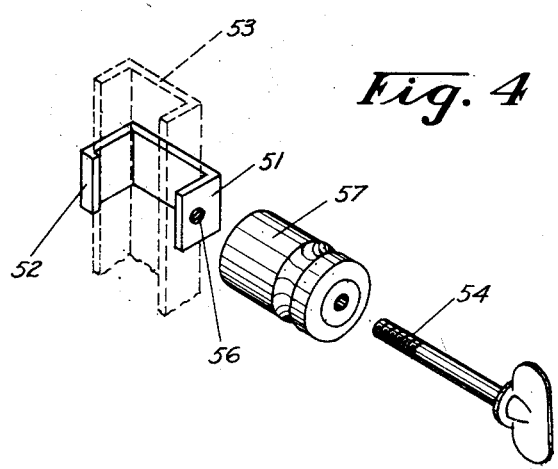
Figure 4 is an exploded view of the insulator and insulator support constructed according to one embodiment of my invention.

In Figure 4 I have illustrated one means for supporting a wire on the post illustrated in Figures 1, 2 and 3. In this structure I may utilize an open C clamp member 51 having a flange, indicated at 52, for engaging the channel post member 53. This clamp member 51 is preferably locked on the post by means of the thumb screw 54 which is threaded through the opening 56. I may utilize a long thumb screw, as illustrated, and the thumb screw may also serve as a support for the insulator 57.

Figure 7:
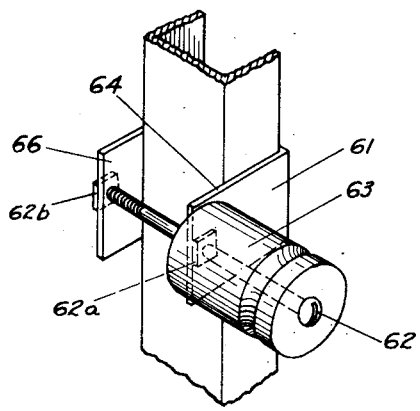
Figure 7 is a view in perspective of the insulator and insulator support shown in Figure 4, and illustrating a modification of the device shown in Figure 4.

In the device illustrated in Figure 7 a U shaped clamp member 61 is employed and a long bolt 62 is used for supporting the insulator 63 and also for drawing together the ears 64 and 66 of the clamping member 61. Nut 62a on the bolt holds the insulator in place. Nut 62b is used to draw the ears up against the nut 62a.

In use, either of the devices shown in Figures 4 and 7 may be moved up and down on the post as desired, to make the post and charged wire properly positioned for any size of animal. The posts here shown may all be readily inserted in the ground by stepping on the step members 21, 24—26, 35 or 49. The device shown in Figure 2 may be folded down so that weeds and grass around the post may be trimmed.

Electric fencing utilizing posts constructed in accordance with my invention may be quickly and easily erected and removed from one location to another. It is possible to confine animals within a portion of a field temporarily without it being necessary to dig post holes and the like. Such fencing may be quickly removed and replaced when it is only desired to mow weeds and the like growing close against the fence. Furthermore, a single charged wire may be strung close to the ground to confine small animals such as pigs. If small and large animals are to be confined, it is preferable that two wires be used.

Although several embodiments of my invention have been shown and described, it is apparent that other modifications may be made. These modifications may be made without departing from the spirit and scope of my invention as set forth in the appended claims.

I claim as my invention:

1. In a fence post, a main upright post member, a pair of divergent members extending downwardly and outwardly therefrom, a rigid cross member fixedly attached between the lowermost ends of the divergent portions, a pair of parallel, relatively slender, rigid prongs comprising extensions of the lower ends of the divergent members, the said rigid cross member being of a length somewhat greater than the width of a normal shoe, whereby the post may be forced into the ground by foot pressure applied to the cross member somewhat in the manner of a digging fork.

2. In a post of the class described, a main post member of channel form with the flanges of the channel extending outwardly and with the lower portion of the post bent angularly from the axis thereof and back into a line parallel with the extended axis, a shorter section also parallel to the extended axis of the main portion of the post and bent inwardly to a position to join the main body of the post, a strap-like channel member joining the inner faces of the two channel members to act as a bracing member and step, the lower ends of the members being sharpened to a point.

GEORGE C. WERNING.